United States Patent Office 3,579,455
Patented May 18, 1971

3,579,455
MACHINE DISHWASHING COMPOSITIONS
CONTAINING SODIUM POLYACRYLATE
Philip M. Sabatelli, Cincinnati, Ohio, and Charles A. Brungs, Covington, Ky., assignors to W. R. Grace & Co., New York, N.Y.
No Drawing. Filed Aug. 2, 1968, Ser. No. 749,592
Int. Cl. C11d 7/14, 7/16, 7/26
U.S. Cl. 252—135
5 Claims

ABSTRACT OF THE DISCLOSURE

A machine dishwashing composition is disclosed which includes alkali metal carbonate, a tetra-alkali metal pyrophosphate, an alkali metal hexametaphosphate, a water-soluble salt of polyacrylic acid, and an alkali metal metasilicate. Cooking and eating utensils may be cleaned by a low foaming aqueous solution of the present machine dishwashing composition with less spotting and greater clarity.

---

This invention relates to a dishwashing composition which effectively removes food soils from glassware, dishes and the like with less spotting and greater clarity. More particularly, the present invention provides a new dishwashing composition which includes an alkali metal carbonate, a tetra-alkali metal pyrophosphate, an alkali metal hexametaphosphate, a water-soluble polymer, and an alkali metal metasilicate. The invention also provides a method for using such a composition.

Heretofore, strongly alkaline solutions have been used in institutional and household dishwashing machines for washing dishware, glasses, and other cooking and eating utensils. Ordinary tap water is customarily used with the cleaning composition to form a cleaning solution and for rinsing purposes subsequent to the cleaning operation. As is well known, spotting on dishes and glassware by inorganic salt residues and precipitates may be a major problem. Deposit formation may also interfere with the operation of the washing equipment by requiring frequent maintenance. Condensed phosphates have been used in these cleaning compositions, but at elevated solution temperatures, rapid hydrolysis typically results and the formation of orthophosphate precipitates occur.

Use of various polyelectrolytes in conjunction with organic detergents has been disclosed in British specification Nos. 451,342 and 1,073,947, and in U.S. Pat. No. 3,308,067. However, in these systems polyelectrolytes have been used in conjunction with organic soaps and detergents in substantially neutral systems where foaming is desirable. Thus, these patents do not provide alkaline, low foaming detergent systems.

By the practice of the present invention, there is provided a superior machine dishwashing composition which more effectively removes food soils and residues from eating and cooking utensils such as dishes, glassware and the like with decreased spotting and greater clarity of the glassware and dishes.

Generally stated, the machine dishwashing composition of this invention comprises from about 20 to about 60 parts by weight of an alkali metal carbonate; from about 2 to about 20 parts by weight of a tetra-alkali metal pyrophosphate; from about 5 to about 25 parts by weight of an alkali metal hexametaphosphate; from about 0.1 to about 10 parts by weight of a water-soluble polymer having a molecular weight of from 1,000 to 15,000,000 and having repeated groups with the formula

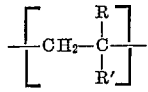

wherein R is either hydrogen or a methyl radical, and R' is selected from the group consisting of amide radical, carboxyl radical and salts thereof; and from about 20 to about 60 parts by weight alkali metal metasilicate. The composition may be combined with up to about 99 parts by weight for use as a liquid although it is desirably prepared as a dry solid.

The process of the present invention for washing dishes and other eating and cooking utensils involves the steps of, applying an aqueous solution of about 0.05 to about 1 weight percent based on the weight of dry solid components of the dishwashing composition of the present invention while at a solution temperature of about 140° F. to about 200° F., and preferably about 140° F. to about 160° F. to the surface of an article to be cleaned, subsequently rinsing the articles free of cleaning solution with water, and drying the rinsed article.

The alkali metal carbonate forming an alkaline component of the present dishwashing composition may be sodium carbonate, potassium carbonate, or mixtures thereof in an amount from about 20 to about 60 parts by weight, and preferably in an amount from about 40 to about 50 parts by weight. Stronger alkaline materials such as sodium or potassium hydroxide, or sodium or potassium orthophosphates may be substituted to a limited extent for some of the carbonate if desired. Sodium tripolyphosphate may also be included if desired. These alkaline materials individually or in combination may be used to replace from about 1 to about 50 weight percent of the alkali metal carbonate. Preferably, however, sodium carbonate is used as the alkaline component.

The tetra-alkali metal pyrophosphate component of the present invention may include any alkali metal such as sodium or potassium. The preferred condensed phosphate, however, is tetra sodium pyrophosphate. The tetra-alkali metal pyrophosphate is added in an amount from about 2 to about 20 parts by weight, and preferably in an amount from about 2 to about 10 parts by weight.

The alkali metal hexametaphosphate component of the present invention may include most any alkali metal with sodium hexametaphosphate being preferred. The alkali metal hexametaphosphate is generally added in an amount from about 5 to about 25 parts by weight and preferably in an amount from about 5 to about 10 parts by weight.

The water soluble organic polymer of the present invention is generally a polyacrylate component having a molecular weight in the range from about 1,000 to about 15,000,000 and having repeated groups with the formula

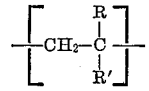

wherein R is either hydrogen or a methyl radical, and R' is either an amide or carboxyl radical and salts thereof. The water soluble organic polymer is included in an amount from about 0.1 to about 10 parts by weight, and preferably in an amount from about 1 to about 5 parts by weight on an anhydrous basis.

Particularly suitable water soluble organic polymers for use in this invention are polyelectrolyte polymers such as those derived from acrylic or methacrylic acid. These materials include, for example, acrylic acid and the alkali metal and ammonium salts thereof, methacrylic acid and the alkali metal and ammonium salts thereof, acrylamide, methacrylamide, the N-alkyl subsituted amides, the N-aminoalkylamides, and the corresponding N-alkylaminoalkyl substituted amides, the aminoalkyl acrylates, the aminoalkyl methacrylamides, and the N-alkyl substituted aminoalkyl esters of either acrylic or methacrylic acids. These polymeric compositions may be homopolymers or they may be copolymers with other copolymerizing monomers, such as ethylene, propylene, isobutylene, styrene, a-methylstyrene, vinyl acetate, vinyl formate, alkyl ether, acrylonitrile, methacrylonitrile, vinyl chloride, vinylidene chloride, the alkyl acrylates, the alkyl methacrylates, the alkyl maleates, and the alkyl fumarates, and other olefinic monomers copolymerizable therewith. The copolymers of this type, having at least 50 mole percent of the acrylic or methacrylic acid derivatives, are preferred, and especially when the comonomer is hydrophobic or has no ionizable groups. Polymers of this type may be prepared directly by the polymerization of suitable monomers, or by the after-chemical reaction of other polymers, for example by the hydrolysis of acrylonitrile or methacrylonitrile polymers.

In connection with the various types of polyelectrolyte polymers suitable for the practice of this invention, the hydrophilic polymer may be prepared directly by the polymerization of one or more of the various available organic monomers with aliphatic unsaturation, if the said compounds contain a hydrophilic group, for example, carboxyl groups. Generally, more types of polyelectrolyte polymers can be prepared by subsequent reactions of polymers and copolymers. For example, polymers containing nitrile groups may be hydrolyzed to form water-soluble amide and carboxyl containing polymers or hydrogenated to form amine-containing polymers. Similarly, copolymers of maleic anhydride and vinyl acetate may be hydrolyzed to form polymers containing hydrophilic lactone rings. Other hydrophilic polymers can be prepared by the hydrolysis of copolymers of vinyl acetate wherein the acetyl groups are removed leaving hydroxy groups which promote the solubilization effect of polyelectrolyte groups present. By other reactions non-hydrophilic polymers may be converted into lactam or amide containing polymers which are more hydrophilic. Polyvinyl alcohol, not in itself a polyelectrolyte, may be converted into polyelectrolyte by esterification with dibasic acids, one of said carboxylic acid groups reacting with the alcohol radical and the other providing the hydrophilic characteristics by a carboxy group on the side chain. Still other types of polymers may be prepared by reacting halogen containing polymers, for example, the polymers or copolymers of vinyl chloroacetate or vinyl chloroethyl ether, with amines to form amine salt radicals and quaternary ammonium radicals whereby hydrophilic characteristics are introduced into what otherwise would be an insoluble polymer. Other soluble polymers can be prepared by the ammonolysis of ketone containing polymers, for example, polyvinyl methyl ketone. Similarly active halogen atoms may be reacted with bisulfite to substitute sulfonic acid groups for the reactive halogens.

Thus, the various polyelectrolytes of the types described above are ethylenic polymers having numerous side chains distributed along a substantially linear continuous carbon atom molecule. The side chains may be hydrocarbon groups, carboxylic acid groups or derivatives thereof, sulfonic acid groups or derivatives thereof, phosphoric acid or derivatives thereof, heterocyclic nitrogen groups, aminoalkyl groups, alkoxy radicals and other organic groups, the number of which groups and the relative proportions of hydrophilic and hydrophobic groups being such as to provide a water-soluble polymeric compound having a substantially large number of ionizable radicals. The length of the said continuous carbon chain must be such as to provide compounds having a weight average molecular weight of at least 1,000.

Among the various polymers as described above and water-soluble salts thereof useful in the practice of the present invention, there may be mentioned hydrolyzed polyacrylonitrile and polyacrylamide, sulfonated polystyrene, acrylamide-acrylic acid copolymers, polyacrylic acid, ½ calcium salt of hydrolyzed 1:1 copolymer of vinyl acetate-maleic anhydride, hydrolyzed styrenemaleic anhydride copolymer, ammonium polyacrylate, sodium polyacrylate, ammonium polymethacrylate, sodium polymethacrylate, diethanolammonium polyacrylate, guanidinium polyacrylate, dimethyl-aminoethyl polymethacrylate, acrylamideacrylonitrile copolymer, methacrylic acid-dimethylaminoethyl methacrylate copolymer, sodium polyacrylate-vinyl alcohol copolymer, hydrolyzed methacrylic acid-acrylonitrile copolymer, vinyl acetatemaleic anhydride copolymer, vinyl formatemaleic anhydride copolymer, vinyl methyl ether-maleic anhydride copolymer, isobutylene-maleic anhydride copolymer, styrene-maleic anhydride copolymer, ethyl acrylate-maleic anhydride copolymer, vinyl chloride-maleic anhydride copolymer, hydrolyzed acrylonitrile vinyl acetate copolymer, hydrolyzed acrylonitrile-methacrylonitrile copolymer, hyrolyzed acrylonitrilemethacrylonitrile-vinyl acetate terpolymer, hydrolyzed acrylonitrile-methacrylic acid copolymer, vinyl pyridine-acrylonitrile copolymer, etc. Polymers containing cation-active groups also are useful. Suitable compounds are, for example, ethyl acrylate and acrylamido-propyl-benzyldimethyl-ammonium chloride, copolymers of methyloacrylamide and acrylamidopropylbenzyl-dimethylammonium chloride, copolymers of butadiene and 2-vinyl pyridine, and certain quaternary compounds such as polydimethylaminostyrene quaternized with benzyl chloride, allyl chloride, etc. and quaternized copolymers of vinyl alcohol and morpholinylethylvinylether and the like.

The preferred polymers are polyacrylic acid, polymethacrylic acid, polyacrylamide, polymethacrylamide, hydrolysis products of the polyamides, or water-soluble salts thereof having a molecular weight of from 1,000 to 200,000 calculated as polyacrylic acid.

The alkali metal metasilicate component of the present invention may include most any alkali metal although sodium metasilicate is preferred. The alkali metal metasilicate is generally added in an amount from about 20 to about 60 parts by weight although an amount of about 40 to about 50 parts by weight is preferred.

The composition of this invention may be stored and used as either a dry mixture of the above ingredients or a concentrated solution with from about 20 to about 80 percent water. Preferably, liquid concentrates of this dishwashing composition may contain from about 40 to about 60 percent water.

A preferred machine dishwashing composition of this invention is shown below:

| | Parts by weight |
|---|---|
| Sodium carbonate | 44 |
| Tetra-sodium pyrophosphate | 4 |
| Sodium hexametaphosphate | 8 |
| Polyacrylate (25% solution) | 5 |
| Sodium metasilicate | 39 |

In the process of this invention, an aqueous solution containing from about 0.05 to about 1 and preferably from about 0.05 to about 0.5 weight percent of the above dishwashing composition is prepared having a temperature of from about 140° F. to about 200° F., and preferably from about 140° F. to about 160° F. This cleaning solution is applied to the surfaces of articles to be cleaned. Although any technique can be used for applying the aqueous solution of the dishwashing composition to the fouled surfaces, it is specifically designed for and is highly effective when used with spray washing equipment of the type conventionally used in cleaning cooking and eating utensils. Highly effective cleaning with low foaming is obtained in institutional dishwashing machines with this composition. After the step of the cleaning, the articles are rinsed with water, and dried.

The unique alkaline dishwashing composition of this invention is highly effective in removing food soils and residues from dishes, glassware, and other cooking and eating utensils in conventional dishwashing machines. Not only are the food residues more effectively removed with the present composition, but also the cleaned dishes and glassware exhibit less spotting and greater clarity than with conventional cleaning compositions.

This invention is further illustrated by the following specific but non-limiting examples.

EXAMPLE 1

This example shows the improved results obtained with a machine dishwashing composition containing sodium polyacrylate, compared with the same composition without the polyacrylate. The washing compositions used in this test are as follows:

|  | Parts by weight | |
|---|---|---|
|  | Control | Sample 1 |
| Sodium carbonate | 44.0 | 44.0 |
| Tetrasodium pyrophosphate | 4.0 | 4.0 |
| Sodium hexametaphosphate | 8.0 | 8.0 |
| Sodium polyacrylate (average M.W. 90,000, 25% solution) | | 4.8 |
| Sodium metasilicate | 44.0 | 39.2 |

Squares of plate glass four inches on each edge were soiled with one gram of a soil containing 50 parts peanut butter, 25 parts hydrogenated vegetable oil, and 25 parts butter. A Hobart A. M. Dishwashing machine was used for the test, the machine having a 48 second wash cycle and a 12 second rinse cycle. No rinse additive was used. The wash water contained 0.3 percent of the dishwashing composition and had a temperature of 150° F. in the wash section. The rinse water had a temperature of 180° F. The water used was Cincinnati tap water having a hardness of 161.5 ppm. In the test a set of 10 plates of glass were run through 8 cycles in the machine with a drying period of 15 minutes allowed between cycles.

Comparing plates cleaned with the Control and Sample 1 compositions, the plates tested with the composition of this invention (Sample 1) were clearer and less streaked in appearance, and the unspotted areas were brighter than on the plates washed with the Control.

A grid 1" x 1" scored into 100 equal parts was applied to the center of each of the 10 glass plates. The percent area covered by spots, streaks, or film is determined by counting the number of squares thus effected.

The standard product exhibited a coverage of 85.6% of the grid surface covered by spots, streaks, or film. The product containing the polyacrylate exhibited a coverage of 84.3% of the grid area.

To demonstrate the ability of the compositions containing the polyacrylate to condition hard water, the composition of the present invention was compared to a conventional dishwashing composition.

|  | Parts by weight | |
|---|---|---|
|  | Control | Sample1 |
| Sodium carbonate | 44.0 | 44.0 |
| Sodium metasilicate ·5H₂O | 39.0 | 29.4 |
| Sodium tripolyphosphate | 13.0 | 13.0 |
| Tetra-sodium pyrophosphate | 4.0 | 4.0 |
| Polyacrylate (average M.W. 93,000) (25% solution) | | 9.6 |

Each of the compositions was diluted to a 0.3% solution in 15 grain hard water and transferred to a 27 mm. x 275 mm. glass cylinder. The solutions were allowed to stand for 20 hours and exhibited varying degrees of hard water precipitate as exemplified by the depth of floc in the bottom of the cylinder.

Composition: mm. of floc after 20 hours
Control _____ 21
Sample 1 _____ 9

The tests showed that the composition of the invention has greater sequestering power than conventional dishwashing compositions and also a greater cleaning power.

It is understood that the foregoing detailed description is given merely by way of illustration and that many variations may be made therein without departing from the spirit of this invention.

What is claimed is:
1. A low foaming dishwashing composition consisting essentially of:
 (a) from about 40 to about 50 parts by weight of an alkali metal carbonate;
 (b) from about 2 to about 10 parts by weight of a tetra-alkali metal pyrophosphate;
 (c) from about 5 to about 10 parts by weight of an alkali metal hexametaphosphate;
 (d) from about 1 to about 10 parts by weight of an alkali metal polyacrylic acid having a molecular weight of from 1,000 to 200,000 calculated as polyacrylic acid;
 (e) from about 20 to 60 parts by weight of an alkali metal metasilicate; and
 (f) from 0 to 99 percent by weight of the composition of water.

2. The composition of claim 1 wherein from about 20 to 80 percent by weight of the composition is water.

3. The dishwashing composition of claim 1 wherein the water component is present in an amount from about 40 to about 60 percent by weight.

4. A low-foaming dishwashing composition according to claim 1 containing about 44 parts by weight sodium carbonate, about 4 parts by weight tetra-sodium pyrophosphate, about 8 parts by weight sodium hexametaphosphate, about 5 parts by weight sodium polyacrylate, and about 39 parts by weight sodium metasilicate.

5. The dishwashing composition of claim 1 wherein from about 1 to about 50 weight percent of the alkali metal carbonate is a member of the group consisting of sodium hydroxide, sodium orthophosphate, and sodium tripolyphosphate.

References Cited

UNITED STATES PATENTS

| 3,332,880 | 7/1967 | Kessler et al. | 252—161 |
| 3,308,067 | 3/1967 | Diehl | 252—161 |
| 2,805,205 | 9/1957 | Touey et al. | 252—152 |
| 2,327,302 | 8/1943 | Dittmar | 252—132 |

FOREIGN PATENTS

| 1,073,947 | 6/1967 | Great Britain | 252—152 |
| 451,342 | 7/1936 | Great Britain | 252—135 |

OTHER REFERENCES

Surface Active Agents, A. M. Schwartz and J. W. Perry, 1949, pages 378–380.

"Mechanical Dishwashing Compounds" by A. E. Lintner, Soap & Chemical Specialties, July 1967, pages 39–42, 89 and 90.

"Mechanical Dishwashing Formulations" by R. R. Keast et al., Soap & Chemical Specialties, June 1968, pages 56, 58 and 60.

Industrial Detergency, edited by W. W. Niven, 1955, pages 213, 223, 227, 237, 238, 246, 247–249 and 251.

LEON D. ROSDOL, Primary Examiner
D. L. ALBRECHT, Assistant Examiner

U.S. Cl. X.R.
252—89, 99, 132